(12) United States Patent
Logakis et al.

(10) Patent No.: US 12,083,911 B2
(45) Date of Patent: Sep. 10, 2024

(54) HEAVY-CURRENT CHARGING CABLE FOR CHARGING AN ELECTRIC VEHICLE

(71) Applicant: ABB E-mobility B.V., Delft (NL)

(72) Inventors: Emmanuel Logakis, Baden-Dättwil (CH); Matteo Bortolato, Trebaseleghe (IT); Jaroslav Hemrle, Baden-Dättwil (CH); Lars Bech, Schiedam (NL); Stefan Raaijmakers, Delft (NL); Wiebe Zoon, Delft (NL); Jean-Marc Oppliger, Fislisbach (CH)

(73) Assignee: ABB E-mobility B.V., Baden (CH)

( * ) Notice: Subject to any disclaimer, the term of this patent is extended or adjusted under 35 U.S.C. 154(b) by 270 days.

(21) Appl. No.: 17/583,015

(22) Filed: Jan. 24, 2022

(65) Prior Publication Data

US 2022/0144111 A1    May 12, 2022

Related U.S. Application Data

(63) Continuation of application No. PCT/EP2020/071025, filed on Jul. 24, 2020.

(30) Foreign Application Priority Data

Jul. 25, 2019    (EP) ................... 19188275

(51) Int. Cl.
*B60L 53/18*    (2019.01)
*B60L 53/302*    (2019.01)
(Continued)

(52) U.S. Cl.
CPC ............. *B60L 53/18* (2019.02); *B60L 53/302* (2019.02); *H01B 7/425* (2013.01); *H01B 9/006* (2013.01)

(58) Field of Classification Search
CPC ....... B60L 53/18; B60L 53/302; H01B 7/425; H01B 9/003; H01B 9/006; Y02T 10/70; Y02T 10/7072; Y02T 90/12; Y02T 90/14
See application file for complete search history.

(56) References Cited

U.S. PATENT DOCUMENTS

| | | | | |
|---|---|---|---|---|
| 3,483,313 A | * | 12/1969 | Schaffhauser | ........... H01B 7/12 |
| | | | | 174/101.5 |
| 2009/0167078 A1 | * | 7/2009 | Watanabe | ................ H01B 7/16 |
| | | | | 307/10.1 |

(Continued)

FOREIGN PATENT DOCUMENTS

| | | |
|---|---|---|
| CN | 1124064 A | 6/1996 |
| CN | 101263756 A | 9/2008 |

(Continued)

OTHER PUBLICATIONS

European Patent Office, International Search Report in International Patent Application No. PCT/EP2020/071025, 4 pp. (Sep. 14, 2020).

(Continued)

*Primary Examiner* — William H. Mayo, III
*Assistant Examiner* — Rhadames Alonzo Miller
(74) *Attorney, Agent, or Firm* — Leydig, Voit & Mayer, Ltd.

(57) ABSTRACT

A system and method for heavy-current charging cables for charging an electric vehicles includes a central heavy-current wire extending in a longitudinal direction, a plurality of heavy-current power wires comprising a power conductor and a power wire insulation surrounding said power conductor, the heavy-current power wires extending parallel to the central wire, a liquid tight inner hose extending in the longitudinal direction and surrounding the heavy-current central wire and the heavy-current power wires thereby defining a first hollow area comprising liquid coolant to flow between the heavy-current central wire and the heavy- (Continued)

current power wires along the longitudinal direction, and a liquid tight outer hose extending in the longitudinal direction and surrounding the inner hose thereby defining a second hollow area comprising liquid coolant to flow between the inner hose and the outer hose along the longitudinal direction.

17 Claims, 2 Drawing Sheets

(51) Int. Cl.
  *H01B 7/42* (2006.01)
  *H01B 9/00* (2006.01)

(56) References Cited

U.S. PATENT DOCUMENTS

| | | | | |
|---|---|---|---|---|
| 2009/0178825 | A1* | 7/2009 | Wu | H01B 7/425 |
| | | | | 174/113 R |
| 2017/0144558 | A1* | 5/2017 | Remisch | B60L 53/18 |
| 2017/0338006 | A1* | 11/2017 | Gontarz | H01R 13/005 |
| 2018/0158572 | A1* | 6/2018 | Ernst | H01B 7/423 |
| 2019/0164665 | A1* | 5/2019 | Sato | H01B 7/421 |
| 2019/0217728 | A1* | 7/2019 | Reber | B60L 53/18 |
| 2019/0237218 | A1* | 8/2019 | Heyne | H01B 9/006 |
| 2020/0086751 | A1* | 3/2020 | Heyne | H01B 9/006 |
| 2020/0317070 | A1* | 10/2020 | Fuhrer | H01B 9/02 |
| 2020/0391601 | A1* | 12/2020 | Maeshiro | B60L 53/16 |

FOREIGN PATENT DOCUMENTS

| | | |
|---|---|---|
| CN | 106887277 A | 6/2017 |
| CN | 109215872 A | 1/2019 |
| CN | 109313966 A | 2/2019 |
| CN | 110040005 A | 7/2019 |
| DE | 102016118193 A1 | 3/2018 |
| DE | 102017217506 A1 | 4/2019 |
| WO | WO 2017/207266 A1 | 12/2017 |

OTHER PUBLICATIONS

European Patent Office, Written Opinion in International Patent Application No. PCT/EP2020/071025, 7 pp. (Sep. 14, 2020).
European Patent Office, Extended European Search Report in European Application No. 19188275.2, 8 pp. (Jan. 21, 2020).

* cited by examiner

HEAVY-CURRENT CHARGING CABLE FOR CHARGING AN ELECTRIC VEHICLE

CROSS-REFERENCE TO RELATED APPLICATIONS

This patent application claims priority to European patent application 19188275.2, filed on Jul. 25, 2019, and to International patent application no. PCT/EP2020/071025, filed on Jul. 24, 2020, which are incorporated herein by reference.

FIELD OF THE DISCLOSURE

The present disclosure relates to charging cables for electric vehicle charging and, more specifically, to an electric vehicle supply equipment comprising a heavy-current charging cable and a cooling unit, as well as to a respective method for cooling a heavy-current charging cable.

BACKGROUND OF THE INVENTION

A liquid cooled charging cable for high power charging of electric vehicles, EVs, with more than 250 A consists typically of a cable arrangement, including a plurality of conductors with the charging cable and a charging connector, wherein power contacts are located in connection with the cables. The coolant loop in the charging cable is generally designed to remove heat generated by Joule effect both in the charging cable and in the charging connector. The liquid cooled charging cable is connected to a cooling unit, generally located inside a charge post, where the heat provided to the coolant by Joule effect is preferably dissipated to the surrounding ambient air.

Such liquid cooling is necessary for high-current fast EV chargers, mainly because the liquid cooling avoids other necessary use of bulky charging conductors which would make the charging cable very difficult to handle. Non-cooled charging cables are typically used for charging current up to 250 A, otherwise the charging cable becomes too large, heavy and stiff for the user. Thus, active liquid cooling is essential, by using a coolant fluid such as for example oils, water/glycol or water/salts mixtures, halogenated hydrocarbon compounds, etc., and said cooling unit for conveying and respective cooling of the liquid coolant.

In a conservative approach, the electrical metallic conductors present in the charging cable, typically Cu, are electrically insulated to prevent shorts between the conductors or to ground through the liquid coolant. In this case, non-insulating coolants, like water/glycol mixtures, can be used, which bring some advantages. First, these mixtures exhibit chemical compatibility with a variety of materials, including rubber-like polymeric materials to be used for electrical insulation, for example silicone rubbers or thermoplastic elastomers. Such materials remain soft even at low temperature. Furthermore, some water-based mixtures have low viscosity even below −30° C., so a heating system and/or a large pump are generally not required to enable a proper operation of the charge post at low temperatures. On the other hand, cooling performance is penalized due to the presence of insulating, and poor thermally conducting, layers between the conductors and the liquid coolant, limiting maximum allowed power rating of the liquid cooled charging cable.

In more advanced solutions known from prior art, the liquid coolant flows directly around the bare and thus uninsulated conductors providing more efficient cooling. In this case, insulating liquids have to be used, like synthetic oils or halogenated hydrocarbon compounds, with drawbacks in terms of their low temperature performance due to increased viscosity and their environmental friendliness, respectively. Many dielectric fluids become very viscous at temperatures below −20° C. It is worth to mention that data available on chemical compatibility between synthetic oils and plastic materials is scarce and unreliable, raising also questions with regards to long term stability.

Existing liquid cooled charging cable solutions suffer drawbacks in terms of safety, reliability and/or performance. For instance, one known solution shows poor performance at low temperatures such as below −20° C. because of excessive pressure drop and problematic material compatibility between the liquid coolant (synthetic oil) and the polymeric material used for flow channels. Another known solution adopts an indirect cooling approach with a water/glycol mixture flowing in separate ducts. The charging cable-to-electric vehicle contacts are well thermally controlled but the heat generated in the conductors is not dissipated effectively. As a consequence, a higher cross section of copper conductors is adopted thus making the cable heavier and a nominal current of 500 A can be reached at 40° C. ambient, only if a cooling unit with a refrigerant loop is used. In addition, both solutions are considered weak in terms of reliability since during normal operation, materials temperature very limit is reached.

Furthermore, in existing solutions, coolant flow can be easily blocked as an example by inner clogging or pipe crushing. This represents potentially a safety issue, especially during a charging session because the thermal runaway can be extremely fast and the interlock system in the charge post may only intervene with a certain delay.

BRIEF SUMMARY OF THE INVENTION

The present disclosure provides a charging cable and respective charge post solution for high power charging at power ratings equal or greater to 500 kW increasing reliability and safety standards.

In one embodiment, the disclosure describes a heavy-current charging cable for charging an electric vehicle, comprising:
  a central heavy-current wire configured for serving as ground, the central wire comprising a central conductor and extending in a longitudinal direction,
  a plurality of heavy-current power wires configured for conducting positive and negative direct current, DC, each of said power wires comprising a power conductor and a power wire insulation surrounding said power conductor, the power wires extending parallel to the central wire,
  a liquid tight inner hose extending in the longitudinal direction and sur-rounding the central wire and the power wires thereby defining a first hollow area comprising liquid coolant to flow between the central wire and the power wires along the longitudinal direction, and
  a liquid tight outer hose extending in the longitudinal direction and sur-rounding the inner hose thereby defining a second hollow area comprising liquid coolant to flow between the inner hose and the outer hose along the longitudinal direction.

The proposed solution provides a heavy-current charging cable suitable for High Power Charging, HPC, of Electrical Vehicles, EV. The solution enables charging at 500 A and 1000V, meeting today's standards for fast DC charging, in particular allowing 100 km of driving within 3 to 5 min charging, and can be also adapted to evolving future requirements towards higher ratings such as charging with 600 A at 1500 V i.e. at 900 kW. Compared to prior art solutions, the proposed solution provides improved thermal and mechanical performance, and ease in manufacturing and assembly. As revealed by thermal simulations, with a commonly used material for the power wire insulation respectively core wire insulation described below, a maximum temperature of the respective conductors remains below 90° C. when a current of 500 A is flowing at ambient temperature up to 50° C. Compared to existing solution as known from prior art, the maximum temperature of conductors at 500 A is reduced by 20 to 25° C.

The simple preferably cylindrical design of all components of the cable provides ease during manufacturing of all components and also in assembling the final liquid cooled cable. The core part of the cable comprised of the conductor wires and the inner hose can be easily assembled together, or purchased in a ready cable form, from an external cable manufacturer. At a second step the aforementioned assembly is inserted into the outer hose. Thus, the proposed solution is readily scalable towards higher power ratings by suitably modifying the dimensions of the conductors, of the inner and outer hose as well as the flow rate of the liquid coolant.

The cable can be part of an electric vehicle supply equipment, EVSE, also referred to as electric vehicle, EV, charging station, electric recharging point, charging point, charge point, charge post or electronic charging station, ECS. The EVSE is an element in an infrastructure that supplies electric energy for recharging of electric vehicles, including electric cars, neighborhood electric vehicles and plug-in hybrids, via said charging cable and a charging connector to the EV.

EVSEs usually comply with standards for electric vehicle fast charging, such as the so-called Combined Charging System, CCS, protocol according to IEC 61851-23 and SAE J1772 standard for charging electric vehicles both in the US and in the European Union, EU. The Combined Charging System, CCS, protocol is a fast charging method for charging electric vehicles delivering high-voltage direct current via a charging connector derived from SAE J1772 standard (IEC Type 1) or IEC Type 2 connector. Automobile manufactures that support CCS include Jaguar, Volkswagen, General Motors, BMW, Daimler, Ford, FCA, Tesla and Hyundai. The CSS standard is controlled by the so called CharIN consortium. Besides other protocols such as, for example, CHAdeMO, as abbreviation of CHArge de Move, or GB/T, in particular according to 20234.3-2011 standard. The proposed solution can be advantageously used with even higher charging currents such as more than 500 A and/or in combination with newer standards not yet defined requiring higher currents.

In one embodiment, the inner hose, the outer hose and/or the arrangement of the power wires surrounding the central wire comprise a cylindrical or cylindrical-like shape form or design. A first hollow area and/or a second hollow area shall advantageously be understood as an 'empty space' through which a flow of liquid coolant can be conveyed or flow. The inner hose and/or the outer hose can be provided as a cooling jacket and/or as an annular, integral jacket which is extruded on and in which the respective hollow chamber is defined. The term heavy-current shall be understood that the conductors and the respective insulation is configured for conveying total currents equal to or greater than 500 A. In a further implementation the cable may comprise a plurality of core wires.

The central wire may comprise a central wire insulation surrounding the central conductor or is non-insulated, and/or the power wires surrounding the central wire. The term surrounding shall be understood that, in a sectional view, the central wire is encompassed by the power wires. Stated differently, the power wires and the core wires are encompassed by the inner hose.

In a preferred implementation, the cable comprises six power wires, each three of the power wires conducting positive and negative DC and arranged alternately around the central heavy-current core. Alternatively, the conductors conducting positive current are arranged on one side on the central heavy-current core and the conductors conducting negative current are arranged on the other side on the central heavy-current core. According to a further preferred implementation the central wire and the power wires are arranged such that the packing factor is 0.777. The packing factor is preferably defined as per DIN EN 60317-11 and/or as conductor area, of all conductors, divided total area, used by all conductors preferably within the inner hose. Usage of seven wires, three power wires for DC+ respectively power plus, three power wires for DC− respectively power minus and one core wire for grounding, is a favorable topology since it allows a high packing factor as 0.777. Furthermore, the total current and the total heat losses due to Joule effect can be divided into six conductors, thus reducing the heat flux on each conductor and minimizing the effect of the insulation layer on the total thermal resistance.

Parameters such as cross sections of the power wires and of the core wire, thickness of the power wire insulation and of the outer hose and/or of the inner hose and/or cable length can be arbitrarily chosen, provided that sufficient dielectric strength is assured between conductors. According to a preferred implementation, a cross section of the power wires is 16 mm$^2$, a cross section of the core wire is 25 mm$^2$, a thickness of the power wire insulation is in a range of 0.5 to 2.0 mm, the outer hose and/or the inner hose comprises a thickness in a range of 2 to 10 mm, and/or the cable comprises a length of 6 m. Such parameters allow charging at 500 A DC and 1000 V DC. In the present disclosure, the term heavy-current shall be understood to refer to a total current greater or equal 500 A can be conducted by the respective conductors or wires.

According to a preferred implementation, the liquid coolant comprises oil, a water and glycol mixture, a water and salt mixture, and/or halogenated hydrocarbon compounds. As coolant liquid a non-insulating fluid such as for example water/glycol mixtures can be used since the proposed solution is compatible with indirect cooling approach. According to numerical calculations, with a preferred coolant having a kinematic viscosity at −40° C. lower than 470 cSt, a maximum pressure drop in a 6 m long cable is of 4 bar, at a flow rate below 1 l/min, and such wise suitable for thermal control of the cable's conductors.

The Inner hose and/or the outer hose can be generally provided from an ordinary but preferably insulating material. Preferably, the inner hose and/or the outer hose are provided as a tube and/or as a sleeve. In a preferred implementation, the inner hose and/or the outer hose comprise a polymer-based material and/or extruded polymer layers. Most preferably, the inner hose and/or the outer hose comprise a polyamide material.

In another preferred implementation, the outer hose comprises a flexible metal tube arranged between the inner hose and the outer hose and whereby the outer hose is extruded on the flexible metal tube. In an alternative implementation, the flexible metal tube is arranged on the outer hose thereby encompassing the outer hose. Such flexible metal tube provides enhanced safety and mechanical robustness for the cable. In particular, in case of a damage in the outer hose the user of the cable is still protected to any exposure to the high voltage cable by both the flexible metal hose, which is preferably also provided water tight, and the inner hose. The flexible metal hose may be grounded. Furthermore, the flexible metal hose provides required mechanical protection in the event an electric vehicle drives over the liquid cooled cable. Therefore, the flexible metal tube is preferably configured to comprise a lateral crushing strength in the range of 65.5 kN/m. The metal tube may comprise, in cross-section, a strip-wound hose made from galvanic steel, for example, cut of carcass wall. Most preferably the metal tube is made of steel, galvanized steel or aluminum, preferably comprising strip-wound profiles to provide necessary flexibility and/or having a bending radius below 300 mm, preferably below 150 mm.

Generally, the central conductor and/or the power conductors may comprise any suitable conducting material. According to a preferred implementation, the central conductor and/or the power conductors comprise copper and/or aluminum wires and/or wire strands. The proposed cable can be simply and thus cost efficient manufactured, whereby in particular the usage of Aluminum instead of Copper conductors results in significant cost reduction. Aluminum has about 60% of the conductivity of copper but has only 30% of the weight of copper. That means that a bare wire of aluminum weighs half as much as a bare wire of copper that has the same electrical resistance. Thus, by keeping constant the total weight per meter of the cable, usage of Aluminum advantageously results in about half the Ohmic losses as compared to Copper. Special aluminum alloys, such as AA-8000 series, exhibit similar to copper creep and elongation properties, meeting the requirements of ASTM B800 for electrical purposes. Thus, thermal performance can be further improved by using Aluminum instead of Copper wires respectively conductors.

According to a further preferred implementation, the central wire, the power wires and/or the inner hose are arranged distant or in spaced relation from each other and/or comprising wire spacers to arrange the central wire, the power wires and/or the inner hose distant from each other. In another preferred implementation the inner hose and the outer hose are arranged distant from each other and/or comprising hose spacers to arrange the inner hose and the outer hose distant or in spaced relation from each other. The wire spacers and/or the hose spacers can be provided as plastic spacers and/or are preferably arranged in a regular pattern. The distance can be selected based on a size of the wire spacers and/or the hose spacers can be for example 2, 3 or 5 mm such that sufficient liquid coolant can flow in the respective hollow area.

In a further preferred implementation, the cable comprises at least a sensor wire extending in the longitudinal direction and arranged within the inner hose and/or between the inner hose and the outer hose. The first hollow area and/or the second hollow area between the electrical conductors as well as the space between the two hoses can host, in particular, thin wires used, for example, for sensing of various parameters such as temperature, humidity, light, acceleration, electrical resistance, etc. either in the charging connector or the liquid cooled cable. In a preferred implementation, the sensor wire comprises a Proximity Pilot, PP, wire for pre-insertion signaling and/or a Control Pilot, CP, wire for post-insertion signaling, in particular as per SAE J1772 and/or IEC 61851 standard. Most preferably, the sensor wire or a plurality thereof is arranged between the inner hose and the outer hose. In this way, safety is also improved by early detection of damage in the outermost layers by placing the Control Pilot and/or Proximity Pilot wire in said hollow second area between the inner and outer hoses.

In one aspect, the disclosure describes an electric vehicle supply equipment, EVSE, comprising the charging cable as described before, a cooling unit and a charging connector, whereby the charging cable is connected between the cooling unit and the charging connector, the cooling unit is configured for conveying the liquid coolant from the cooling unit between the inner hose and the outer hose towards the charging connector and the charging connector is configured for returning the liquid coolant through the inner hose towards the cooling unit.

Compared to prior art solutions, the proposed solution provides improved thermal and mechanical performance, and ease in manufacturing and assembly. The cooling unit is preferably configured for conveying a coolant having a kinematic viscosity at −40° C. lower than 470 cSt having a maximum pressure drop in a 6 m long cable of 4 bar at a flow rate below 1 l/min. The cooling unit preferably comprises means for storing, cooling and/or conveying the liquid coolant across the entire extension of the cable. Cooling unit, cable and charging connector are preferably provided as closed cooling circuit, in particular by means of the inner hose and the outer hose.

In a preferred implementation, the EVSE is configured to charge the electric vehicle with a current rating equal to or greater than 500 A DC and/or a voltage rating equal to or greater than 1000 V DC. The EVSE may comprise a transformer and/or a converter for connecting to respectively receiving electrical energy from an AC grid, which is transformed and/or converted to DC for being supplied via the charging cable to the electric vehicle connected thereto via the charging connector.

The object is even further solved by a method for liquid cooling a heavy-current charging cable for charging an electric vehicle, the cable comprising:
  a central heavy-current wire configured for serving as ground, the central wire comprising a central conductor and extending in a longitudinal direction,
  a plurality of heavy-current power wires configured for conducting positive and negative direct current, DC, each of said power wires comprising a power conductor and a power wire insulation surrounding said power conductor, the power wires extending parallel to the central wire,
  a liquid tight inner hose extending in the longitudinal direction and sur-rounding the central wire and the power wires thereby defining a first hollow between the central wire and the power wires along the longitudinal direction, and
  a liquid tight outer hose extending in the longitudinal direction and surrounding the inner hose thereby defining a second hollow area between the inner hose and the outer hose along the longitudinal direction, the method comprising the step of:
  conveying liquid coolant through the first hollow area and the second hollow area.

Further embodiments and advantages of the method are directly and unambiguously derived by the person skilled in the art from the cable as described before.

BRIEF DESCRIPTION OF THE SEVERAL VIEWS OF THE DRAWINGS

The various aspects of the invention will be apparent from and elucidated with reference to the implementations described hereinafter.

DETAILED DESCRIPTION OF PREFERRED EMBODIMENTS

The present disclosure relates to a heavy-current charging cable for charging an electric vehicle, comprising a central heavy-current wire configured for serving as ground, the central wire comprising a central conductor and extending in a longitudinal direction, and a plurality of heavy-current power wires configured for conducting positive and negative direct current, DC, each of said power wires comprising a power conductor and a power wire insulation surrounding said power conductor, the power wires surrounding and extending parallel to the central wire.

Figure 1:
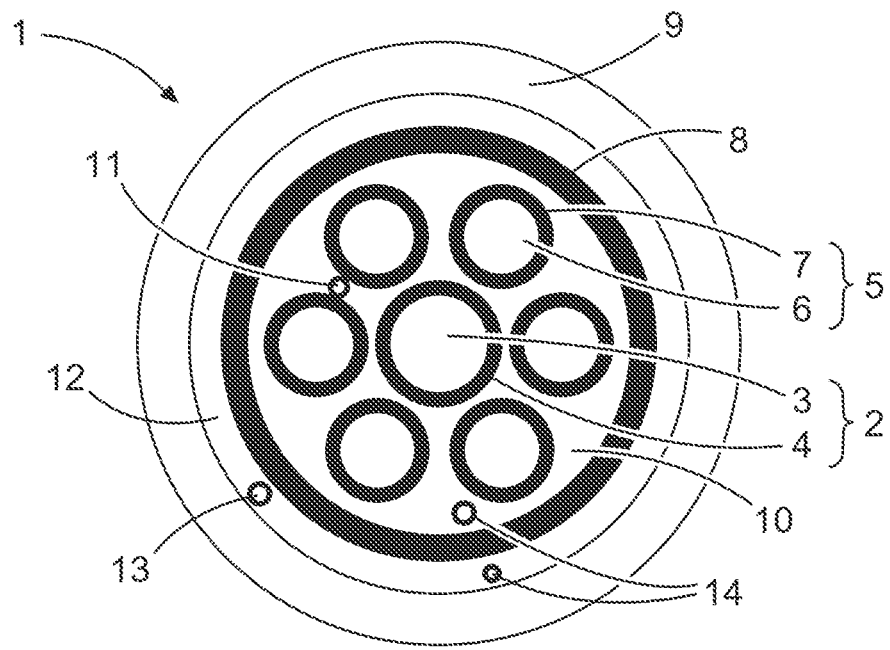
FIG. 1 shows a heavy-current charging cable according to a preferred implementation in a sectional view, in accordance with the disclosure.
Figure 2:
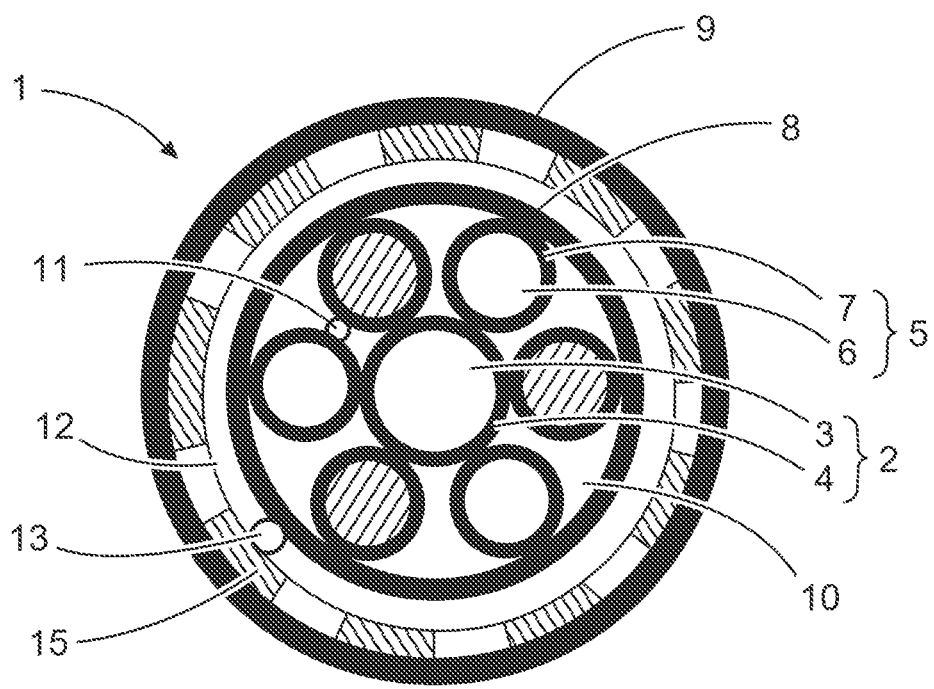
FIG. 2 shows a heavy-current charging cable according to another preferred implementation in a sectional view, in accordance with the disclosure.

FIGS. 1 and 2 each shows a heavy-current charging cable 1 for charging an electric vehicle according to preferred embodiments in a sectional view. The cable 1 comprises one central heavy-current wire 2 serving as ground, which comprises a central conductor 3 extending in a longitudinal direction orthogonal to the figure layer and a central wire insulation 4 surrounding the central conductor 3. While not shown, the central conductor 2 can be provided non-insulated. The central conductor 2 comprises a cross section of 25 mm$^2$, while the central wire insulation 3 comprises thickness of 0.5 to 2 mm.

The heavy-current charging cable 1 further comprises six heavy-current power wires 5, each configured for conducting positive and negative direct current, DC. The six heavy-current power wires 5 each extends parallel to the central wire 2 and is arranged around thereby surrounding the central heavy-current wire 2 such that alternately one heavy-current power wire 5 conveys positive DC and another, next or adjacent heavy-current power wire 5 conveys negative DC. Each heavy-current power wire 5 comprises a power conductor 6 and a power wire insulation 7 surrounding said power conductor 6. Each power conductor 6 comprises a cross section of 16 mm$^2$, while the power wire insulation 7 comprises a thickness of 0.5 to 2 mm. With such arrangement of the central wire 2 and the power wires 5, a packing factor of 0.777 for the cable 1 is achieved. The central conductor 3 and the power conductors 6 consists of copper, aluminum or a mixture thereof, and/or the conductors can be made as solid conductors or comprise wire strands. Alternatively, the power conductors 5 conducting positive current are arranged on one side on the central heavy-current wire 2 and the power conductors 5 conducting negative current are arranged on the other side on the central heavy-current wire 2.

The cable 1 further comprises a liquid tight inner hose 8 and a liquid tight outer hose 9 made of a polymer-based material and/or comprising extruded polymer layers. Both the liquid tight inner hose 8 and the liquid tight outer hose 9 extend in the longitudinal direction, whereby the liquid tight inner hose 8 surrounds the central wire 2 and the power wires 5, thereby defining a first hollow area 10. In other words, the liquid tight inner hose 8 does not surround the central wire 2 and the power wires 5 such that said wires 2, 5 are arranged tight to each other and with the inner hose 8. Wire spacers 11 are arranged in regular pattern between the central wire 2, the power wires 5 and the inner hose 8 for facilitating such arrangement. In an analogous manner the outer hose 9 surrounds the inner hose 8 thereby defining a second hollow area 12 between both hoses 8, 9. Hose spacers 13 are arranged in regular pattern between both hoses 8, 9 for facilitating such arrangement so that the hoses 8, 9 do not touch each other at any location. Inner hose 8 comprises an inner diameter of 25 mm and an outer diameter of 29 mm, whereby the outer hose 9 comprises an inner diameter of 33 mm and an outer diameter of 40 mm.

First hollow area 10 and second hollow area 12 are each filled with a liquid coolant to flow between the central wire 2 and the power wires 5 along the longitudinal direction within the inner hose 8 and thus around respectively in direct con-tact with each the central wire 2 and all power wires 5 and flow between the inner hose 8 and the outer hose 9. The liquid coolant comprises oil, a water and glycol mixture, a water and salt mixture, and/or halogenated hydrocarbon compounds. In addition to the liquid coolant, sensor wires 14 are provided in the hollow area 10 and second hollow area 12 extending in longitudinal direction for submitting, among others, control pilot, CP, and proximity pilot, PP, signals.

Figure 3:
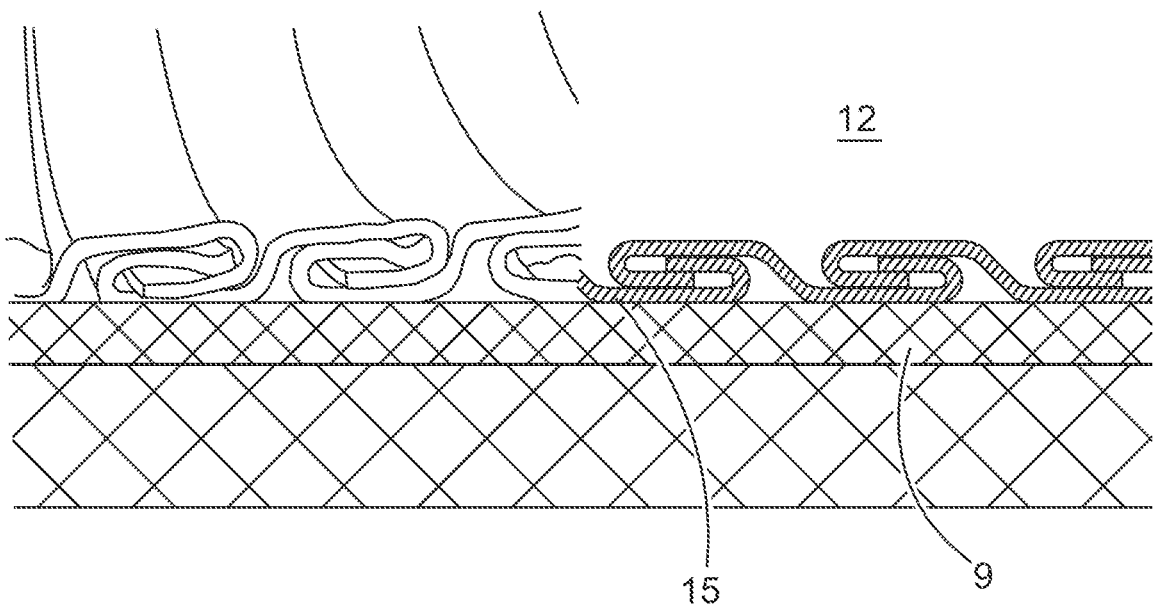
FIG. 3 shows a flexible metal tube of the heavy-current charging cable according to FIG. 2 in two sectional views.

The implementation in FIG. 2 comprises in addition to the implementation of FIG. 1 a flexible metal tube 15, which is arranged between the inner hose 8 and the outer hose 9, whereby the outer hose 9 is extruded on the flexible metal tube 14. FIG. 3 shows the flexible metal tube 15 in two sectional views besides each other, on the left as semi-perspective view and on the right as sectional view.

Figure 4:
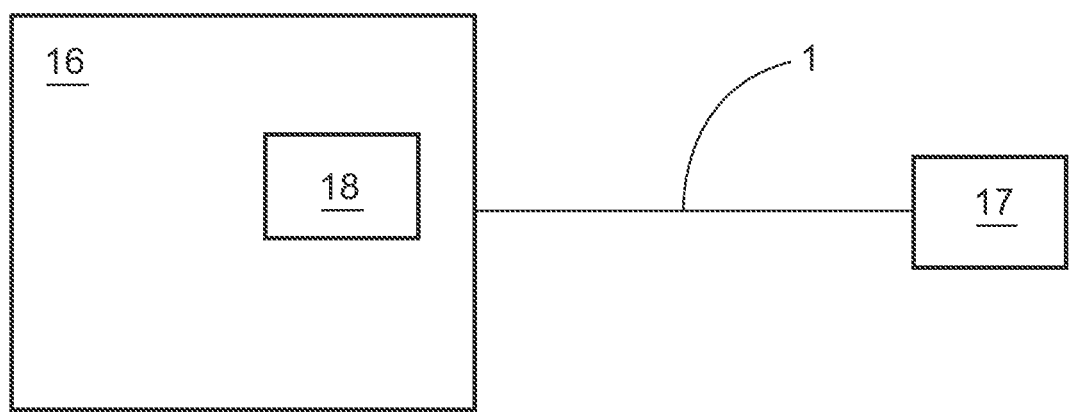
FIG. 4 shows an electric vehicle supply equipment comprising the cable of FIG. 1 or 2 according to a preferred implementation in a schematic view.

FIG. 4 shows an electric vehicle supply equipment, EVSE, 16, comprising the charging cable 1 and a charging connector 16. The EVSE 16 is connected via a transformer and/or a converter for receiving electrical energy from an AC grid, not shown, which is transformed and/or converted to DC for being supplied via the charging cable 1 having a length of 6 m to the electric vehicle connected thereto via the charging connector 17 to charge the electric vehicle with a current rating greater or equal than 500 A DC and a voltage rating greater or equal than 1000 V DC. The EVSE 16 comprises a cooling unit 18 having a liquid coolant reservoir, a coolant-to-air heat exchanger and a respective pump for circulating the liquid coolant from the cooling unit 18 between the inner hose 8 and the outer hose 9 towards the charging connector 17. The charging connector 17 is configured for returning the liquid coolant through the inner hose 8 towards the cooling unit 18 such that thereby the liquid coolant circulates around the central wire 2 and all power wires 5 for cooling the respective central conductor 3 and the power conductors 6.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 1 cable
2 central heavy-current wire
3 central conductor
4 central wire insulation
5 heavy-current power wire
6 power conductor
7 power wire insulation
8 inner hose
9 outer hose
10 first hollow area
11 wire spacer
12 second hollow area
13 hose spacer
14 sensor wire
15 metal tube
16 electric vehicle supply equipment
17 charging connector
18 cooling unit All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A heavy-current charging cable for charging an electric vehicle, comprising:
    a central heavy-current wire configured for serving as ground, the central heavy-current wire comprising a central conductor and extending in a longitudinal direction;
    a plurality of heavy-current power wires configured for conducting positive and negative direct current, DC, the heavy-current power wires surrounding the heavy-current central wire, and each of said heavy-current power wires comprising a power conductor and a power wire insulation surrounding said power conductor, the heavy-current power wires extending parallel to the central wire;
    a liquid tight inner hose extending in the longitudinal direction and surrounding the heavy-current central wire and the heavy-current power wires thereby defining a first hollow area comprising a liquid coolant to flow between the heavy-current central wire and the heavy-current power wires along the longitudinal direction; and
    a liquid tight outer hose extending in the longitudinal direction and surrounding the inner hose thereby defining a second hollow area comprising an additional liquid coolant to flow between the inner hose and the outer hose along the longitudinal direction.

2. The heavy-current charging cable of claim 1, wherein the heavy-current central wire is non-insulated.

3. The heavy-current charging cable of claim 1, further comprising a central wire insulation surrounding the central conductor.

4. The heavy-current charging cable of claim 1, wherein the cable comprises six heavy-current power wires, each three of the heavy-current power wires conducting positive and negative DC and arranged alternately around the central heavy-current wire.

5. The heavy-current charging cable of claim 1, wherein the cable comprises six heavy-current power wires and wherein a first plurality of heavy-current power wires conducting positive current is arranged on one side of the central heavy-current wire and a second plurality of heavy-current power wires conducting negative current is arranged on another side of the central heavy-current wire.

6. The heavy-current charging cable of claim 1, wherein the heavy-current central wire and the heavy-current power wires are arranged such that a packing factor is 0.777.

7. The heavy-current charging cable of claim 1, wherein a cross section of the heavy-current power wires is 16 $mm^2$, a cross section of the heavy-current core wire is 25 $mm^2$, a thickness of the power wire insulation is in a range of 0.5 to 2.0 mm, the outer hose comprises a thickness in a range of 5 to 10 mm, and the cable comprises a length of 6 m.

8. The heavy-current charging cable of claim 1, wherein the liquid coolant comprises oil, a water and glycol mixture, a water and salt mixture, and/or halogenated hydrocarbon compounds.

9. The heavy-current charging cable of claim 1, wherein at least one of the inner hose and the outer hose comprises at least one of a polymer-based material and extruded polymer layers.

10. The heavy-current charging cable of claim 1, wherein the outer hose comprises a flexible metal tube arranged between the inner hose and the outer hose, and wherein the outer hose is extruded on the flexible metal tube.

11. The heavy-current charging cable of claim 1, wherein at least one of the central conductor and the power conductors comprises copper or aluminum wires, or copper or aluminum strands.

12. The heavy-current charging cable of claim 1, wherein the central wire, the power wires and the inner hose are arranged in spaced relation from each other and comprise wire spacers to arrange the central heavy-current wire, the power heavy-current wires and the inner hose distant from each other.

13. The heavy-current charging cable of claim 1, wherein the inner hose and the outer hose are arranged distant from each other and comprise hose spacers to arrange the inner hose and the outer hose in spaced relation from each other.

14. The heavy-current charging cable of claim 1, further comprising at least a sensor wire extending in the longitudinal direction and arranged within the inner hose or between the inner hose and the outer hose.

15. An electric vehicle supply equipment (EVSE), comprising:
a charging cable;
a cooling unit; and
a charging connector;
wherein the charging cable comprises:
a central heavy-current wire configured for serving as ground, the central heavy-current wire comprising a central conductor and extending in a longitudinal direction;
a plurality of heavy-current power wires configured for conducting positive and negative direct current, DC, the heavy-current power wires surrounding the heavy-current central wire, and each of said heavy-current power wires comprising a power conductor and a power wire insulation surrounding said power conductor, the heavy-current power wires extending parallel to the central wire;
a liquid tight inner hose extending in the longitudinal direction and surrounding the heavy-current central wire and the heavy-current power wires thereby defining a first hollow area comprising a liquid coolant to flow between the heavy-current central wire and the heavy-current power wires along the longitudinal direction; and
a liquid tight outer hose extending in the longitudinal direction and surrounding the inner hose thereby defining a second hollow area comprising an additional liquid coolant to flow between the inner hose and the outer hose along the longitudinal direction;
wherein the charging cable is connected between the cooling unit and the charging connector,
the cooling unit is configured for conveying the liquid coolant from the cooling unit between the inner hose and the outer hose towards the charging connector, and
the charging connector is configured for returning the liquid coolant through the inner hose towards the cooling unit.

16. The EVSE of claim 15, wherein the EVSE is configured to charge an electric vehicle with a current rating equal to or greater than 500 A DC and/or a voltage rating equal to or greater than 1000 V DC.

17. A method for liquid cooling a heavy-current charging cable for charging an electric vehicle, comprising:
providing a cable, the heavy-current charging cable, comprising:
a central heavy-current wire configured for serving as ground, the central heavy-current wire comprising a central conductor and extending in a longitudinal direction,
a plurality of heavy-current power wires configured for conducting positive and negative direct current, DC, the heavy-current power wires surrounding the heavy-current central wire, and each of said heavy-current power wires comprising a power conductor and a power wire insulation surrounding said power conductor, the heavy-current power wires extending parallel to the central heavy-current wire,
a liquid tight inner hose extending in the longitudinal direction and surrounding the central heavy-current wire and the heavy-current power wires thereby defining a first hollow area between the central heavy-current wire and the heavy-current power wires along the longitudinal direction, and
a liquid tight outer hose extending in the longitudinal direction and surrounding the inner hose thereby defining a second hollow area between the inner hose and the outer hose along the longitudinal direction;
wherein the method comprises:
conveying liquid coolant through the first hollow area and the second hollow area.

* * * * *